US012761355B2

(12) United States Patent
Lemaitre et al.

(10) Patent No.: US 12,761,355 B2
(45) Date of Patent: Oct. 13, 2026

(54) PULSE-COMPRESSION LIDAR SYSTEM

(71) Applicants: OFFICE NATIONAL D'ETUDES ET DE RECHERCHES AÉROSPATIALES, Palaiseau (FR); CENTRE NATIONAL D'ETUDES SPATIALES C N E S, Paris (FR)

(72) Inventors: François Lemaitre, Palaiseau (FR); Nicolas Cezard, Palaiseau (FR); Philippe-Jean Hebert, Paris (FR)

(73) Assignees: OFFICE NATIONAL D'ETUDES ET DE RECHERCHES AÉROSPATIALES, Palaiseau (FR); CENTRE NATIONAL D'ETUDES SPATIALES C N E S, Paris (FR)

( * ) Notice: Subject to any disclaimer, the term of this patent is extended or adjusted under 35 U.S.C. 154(b) by 481 days.

(21) Appl. No.: 18/560,072

(22) PCT Filed: Apr. 26, 2022

(86) PCT No.: PCT/FR2022/050783
§ 371 (c)(1),
(2) Date: Nov. 9, 2023

(87) PCT Pub. No.: WO2022/238634
PCT Pub. Date: Nov. 17, 2022

(65) Prior Publication Data

US 2024/0241253 A1 Jul. 18, 2024

(30) Foreign Application Priority Data

May 11, 2021 (FR) ...................................... 2104964

(51) Int. Cl.
*G01S 17/26* (2020.01)
*G01S 7/481* (2006.01)
(Continued)

(52) U.S. Cl.
CPC .............. *G01S 17/26* (2020.01); *G01S 7/481* (2013.01); *G01S 7/483* (2013.01); *G01S 7/484* (2013.01);
(Continued)

(58) Field of Classification Search
CPC ........ G01S 17/26; G01S 7/483; G01S 7/4861; G01S 7/481; G01S 7/486; G01S 7/4865; G01S 7/4866; G01S 7/487
See application file for complete search history.

(56) References Cited

U.S. PATENT DOCUMENTS 7,342,651 B1 3/2008 Woolfson
2003/0223757 A1 12/2003 Yamamoto et al.
(Continued)

FOREIGN PATENT DOCUMENTS

CN 102645236 A 8/2012
CN 104614719 A 5/2015
(Continued)

OTHER PUBLICATIONS

WIPO Int'l Bureau, English Translation of the Written Opinion for PCT/FR2022/050783 (Nov. 1, 2022) (Year: 2022).*
(Continued)

*Primary Examiner* — David N Werner
(74) *Attorney, Agent, or Firm* — Maier & Maier, PLLC

(57) ABSTRACT

A LIDAR system which is intended for performing distance measurements is adapted to implement a pulse-compression effect. To this end, a transmission path of the LIDAR system includes two transfer pathways which are arranged in parallel, and at least one of the transfer pathways includes a pulse-compression modulator. A detection path of the LIDAR system includes a digital processing module configured to calculate a correlation function between measurement detection signals and reference detection signals. The
(Continued)

improvements of double heterodyne detection and a comb-shaped pulse spectrum may optionally be used.

12 Claims, 11 Drawing Sheets

(51) Int. Cl.
*G01S 7/483* (2006.01)
*G01S 7/484* (2006.01)
*G01S 7/486* (2020.01)
*G01S 7/4861* (2020.01)
*G01S 7/4865* (2020.01)
*G01S 7/487* (2006.01)

(52) U.S. Cl.
CPC ............ *G01S 7/486* (2013.01); *G01S 7/4861* (2013.01); *G01S 7/4865* (2013.01); *G01S 7/4866* (2013.01); *G01S 7/4818* (2013.01); *G01S 7/487* (2013.01)

(56) References Cited

U.S. PATENT DOCUMENTS

2006/0139620 A1* 6/2006 Hopwood ............... G01S 7/486 356/5.1
2008/0018881 A1* 1/2008 Hui ....................... G01S 7/4917 356/5.09
2015/0177367 A1* 6/2015 Sebastian ................ G01S 17/06 356/5.09
2016/0154104 A1* 6/2016 Schumann .............. G01S 15/52 367/91
2016/0259039 A1* 9/2016 Ohtomo .................. G01S 17/36
2016/0377721 A1 12/2016 Lardin et al.
2017/0016981 A1* 1/2017 Hinderling .............. G01S 7/487
2017/0155225 A1* 6/2017 Villeneuve .......... H01S 3/06754
2017/0293018 A1* 10/2017 Turbiner ................... G01S 7/32
2018/0224547 A1* 8/2018 Crouch ................... G01S 17/32
2018/0241477 A1* 8/2018 Turbide .................. G01S 7/497
2018/0267151 A1 9/2018 Hall et al.
2018/0372870 A1* 12/2018 Puglia ..................... G01S 17/10
2019/0011588 A1* 1/2019 Ji ........................... G01V 1/005
2019/0033453 A1* 1/2019 Crouch ................ H04B 10/505
2019/0063963 A1 2/2019 Lanticq et al.
2019/0170859 A1* 6/2019 Bailey ..................... G01S 7/481
2019/0331796 A1* 10/2019 Pillet ..................... G01S 7/4913
2019/0383940 A1 12/2019 Hebert et al.
2020/0033259 A1 1/2020 Krausz et al.
2020/0049799 A1 2/2020 Ando et al.
2020/0292674 A1* 9/2020 Angus ................... G01S 7/4814
2020/0400798 A1* 12/2020 Rezk ..................... G01S 7/4817
2021/0055391 A1* 2/2021 LaChapelle ........... G01S 7/4865
2021/0055392 A1 2/2021 Lee et al.
2021/0124050 A1 4/2021 Puglia et al.
2021/0173058 A1* 6/2021 Viswanatha .......... G01S 7/4913
2022/0043149 A1* 2/2022 LaChapelle ............. G01S 7/484
2022/0334256 A1* 10/2022 Michel .................... G01S 7/484
2023/0408693 A1* 12/2023 Behringer ............. G01S 7/4917
2024/0264287 A1* 8/2024 Lombard .............. G01S 7/4818
2024/0329249 A1* 10/2024 Lombard ................ G01S 7/486

FOREIGN PATENT DOCUMENTS

CN 108603773 A 9/2018
CN 110646779 A 1/2020
CN 110691983 A 1/2020
JP S5786071 A 5/1982
JP H10242555 A 9/1998
JP 2004062153 A 2/2004
JP 2005055356 A 3/2005
JP 2015075614 A 4/2015
JP 2017198514 A 11/2017
JP 2020024186 A 2/2020
JP 2020512553 A 4/2020
WO 2017187815 A1 11/2017

OTHER PUBLICATIONS

Mottet et al., "Tunable Frequency Shifter Based on LiNbO3—I&Q Modulators", Photline Delivering Modulation Solutions, 2016, 5 pages.
Zheng et al., "Simultaneous Range and Speed Measurement by Vehicle Laser Radar Based on Psuedo-Random Noise Code Modulation", Journal of Computer Applications, Mar. 10, 2017, vol. 37, No. 3, pp. 911-914, with English abstract.
Zheng et al., "Phase noise reduction by using dual-frequency laser in coherent detection", Optics & Laser Technology, vol. 80, Jan. 19, 2016, pp. 169-175.
Zheng et al., "Phase noise reduction by using dual-frequency laser in coherent detection", Optics and Laser Technology, Elsevier Science Publishers BV., Amsterdam, NL, Jan. 19, 2016, vol. 80, pp. 169-175.
International Search Report for PCT/FR2022/050783 mailed Oct. 11, 2022, 7 pages.
Written Opinion of the ISA for PCT/FR2022/050783 mailed Oct. 11, 2022, 9 pages.

* cited by examiner

PULSE-COMPRESSION LIDAR SYSTEM

CROSS-REFERENCE TO RELATED APPLICATIONS

This application is the U.S. national phase of International Application No. PCT/FR2022/050783 filed Apr. 26, 2022 which designated the U.S. and claims priority to FR 2104964 filed May 11, 2021, the entire contents of each of which are hereby incorporated by reference.

TECHNICAL FIELD

This description concerns a pulse-compression LIDAR system.

PRIOR ART

LIDAR systems, LIDAR being the acronym for "Light Detection And Ranging", are widely used to measure distances. A measurement sequence consists of emitting a beam of radiation towards a target, and collecting a portion of this radiation which has been retroreflected or backscattered by the target, then deducing from this an evaluation of the distance separating the location where the target is located and the LIDAR system. This evaluation is carried out by determining the length of time between the emission of the radiation by the LIDAR system and the detection of the portion of this radiation which has been retroreflected or backscattered by the target. In practice, the radiation beam is emitted in the form of a series of successive pulses, and the detection signals for the radiation portions retroreflected or backscattered by the target which correspond one-to-one to all the pulses in the series, are cumulative. In this manner, it is possible to measure the distance from a target even when the intensity of the radiation retroreflected or backscattered by it is low. A compromise is then made between a value which is sufficient for a signal-to-noise ratio of the cumulative detection signals, and the amount of energy used to perform a measurement. Furthermore, the spatial resolution along the pulse emission direction is a significant concern for LIDAR systems which use atmospheric backscatter. This resolution corresponds to an identified slice of atmosphere whose thickness is known. The more detailed the resolution (in other words the thickness of each slice of atmosphere to which a measured absorption value relates), the shorter each pulse. But then, for a determined pulse energy as made necessary by the operating conditions and the desired measurement quality, the shorter each pulse—put another way, the sharper the spatial resolution—the higher the peak power value of each pulse.

Furthermore, implementation of a LIDAR system by using optical fiber connection technology offers considerable advantages, in particular an increased robustness of the system and the elimination of mechanisms for aligning the optical components of the system relative to each other. But the known phenomenon of stimulated Brillouin scattering, or SBS, which occurs in optical fibers limits the peak power value that each emitted pulse can have. Because of this peak power limitation, and when the retroreflection or backscattering capacity of the target is very low, it is necessary to increase the number of pulses emitted for each measurement so that the detection signal has a sufficient value for the signal-to-noise ratio. However, the duration of a measurement is increased accordingly, and the axial resolution degraded.

Document US 2020/049799 A1 describes a multi-heterodyne type of LIDAR system architecture, in which N phase modulators are used in parallel to produce N heterodyne detection beats which have different frequencies.

Document US 2021/055392 A1 describes a LIDAR system which makes use of a correlation between a measurement beam which is backscattered by a target, and a reference beam which is not backscattered by the target. In other words, the LIDAR system in that document does not use a dual probing beam to apply signal correlation.

Documents U.S. Pat. No. 7,342,651 B1 and US 2019/383940 A1 describe other LIDAR systems which use doublet or comb pulses.

Finally, document US 2016/377721 A1 describes a LIDAR system with two separate laser sources.

Technical Problem

From this situation, one object of the present invention is to propose a new LIDAR system which at least partly overcomes these disadvantages.

Thus, one of the objects of the invention is to make it possible to measure the distance away from a target with an improved compromise between the value of the signal-to-noise ratio and the peak power consumed for each measurement, even when the target has a low or very low retroreflection or backscattering capacity.

An ancillary object of the invention is to propose such LIDAR system in which the transmission path can be implemented using optical fibers.

Finally, a general object of the invention is to provide distance measurements which are more precise than with the LIDAR systems of the prior art, at equal duration for each measurement cycle and at equal retroreflection or backscattering capacity of the target, and in particular when the target consists of particles suspended in the atmosphere.

SUMMARY OF THE INVENTION

To achieve at least one of these or other objects, a first aspect of the invention proposes a LIDAR system which comprises a transmission path and a detection path, the transmission path comprising a laser source and being adapted to emit pulses of radiation towards a target which is external to the LIDAR system. For the invention, the transmission path comprises two transfer pathways which are placed in parallel and arranged so as to simultaneously receive, at respective inputs of these transfer pathways, respective portions of a radiation from the laser source. In addition, the two transfer pathways are arranged, at output, to superpose components of each pulse which are delivered by these two transfer pathways. At least one of both transfer pathways comprises:

- a modulator, called a pulse-compression modulator, which can be of the acousto-optic modulator type; and
- a pulse-compression controller, which is connected so as to control the pulse-compression modulator in a manner that modulates the pulse component delivered by that transfer pathway.

In this manner, during an operation of the LIDAR system, at least two components of each pulse

- are produced simultaneously from the radiation originating from the laser source,
- are superposed within the pulse over a duration of this pulse,
- have respective spectra which are different, and at least one of both components of the pulse is phase- or frequency-modulated.

In a known manner, any radiation, in particular pulsed radiation, has temporal field variations which are periodic, and frequency or phase modulation of this radiation consists of applying variations to its frequency, or applying variations to its phase which are supplemental to those which correspond to the periodic field variations.

The detection path of the LIDAR system of the invention comprises at least one photodetector and is arranged to fulfill the functions of:

a measurement path, dedicated to detecting the radiations which correspond one-to-one to the pulses emitted by the transmission path after these pulses have been retroreflected or backscattered by the target, delivering measurement detection signals; and a reference path, dedicated to detecting the radiations representative of the pulses as emitted by the transmission path, delivering reference detection signals.

Thus, each among the measurement path and reference path detects beats which are used to determine the distance of the target from the LIDAR system. In the absence of heterodyne detection, these beats result from the interference between pulse components which come from one of the two transfer pathways and those which come from the other transfer pathway, all these pulse components being detected by the measurement path after having been retroreflected or backscattered by the target, and as emitted by the LIDAR system for the reference path. When heterodyne detection is used, these beats as caused by the association of the two transfer paths are replaced by beats which result from additional interference with a reference beam, for the pulse components received after their retroreflection or backscattering on the target for the measurement path, and for the pulse components as emitted by the LIDAR system for the reference path.

The detection path further comprises a digital processing module which is arranged to receive the measurement detection signals and the reference detection signals, and which is configured to calculate a correlation function between these signals. In this manner, the component(s) of each pulse which is (are) modulated, combined with the correlation function which is calculated, produce(s) a pulse-compression effect.

Thanks to this pulse-compression effect, the value of the signal-to-noise ratio which affects the result of the correlation function is improved at an equal average power consumed to perform a measurement, compared to a result from accumulating detection signals that are obtained without a pulse-compression effect. This improvement provided by the pulse-compression effect is made possible by coherent integration, as opposed to detection signals which are accumulated incoherently for successive pulses. The precision and resolution of each distance measurement are thus improved. Presented differently, at an equal value for the signal-to-noise ratio, the LIDAR system of the invention makes it possible to reduce the time required to carry out each measurement. Thus, the measurement duration can be reduced, and/or the peak power value of each emitted pulse can be reduced. Due to this last possibility, the LIDAR system of the invention can be used with targets which have retroreflection or backscattering capacities which are weak or very weak, even if the transmission path of the LIDAR system is implemented using fiber optic technology.

The gain in terms of increase in the signal-to-noise ratio, or in terms of spatial resolution for the distance measurement, is a factor which is substantially equal to the product of the spectral width of each pulse component which is modulated to produce the pulse-compression effect, and the duration of this pulse. This product may be greater than 500, preferably greater than 5000.

Due to its transmission path having two transfer pathways arranged in parallel, the LIDAR system of the invention is called a double probe beam, or DPB.

Within this transmission path, only one of the transfer pathways may be provided with a pulse-compression modulator with an associated pulse-compression controller, or both transfer pathways may be provided with respective pulse-compression modulators, with pulse-compression controllers associated one-to-one with these modulators. In the latter case, the two transfer pathways can generate temporal variations which preferably have opposite directions of variation, for respective optical frequencies of the two pulse components delivered by these transfer pathways.

It is possible for each pulse-compression controller to be adapted to control, during the operation of the LIDAR system and for the pulse component which is delivered by the transfer pathway to which this pulse-compression controller belongs, a gradual variation in optical frequency over the duration of the pulse. In addition, this gradual variation in optical frequency may have a rate of variation which is substantially constant over the duration of the pulse.

Within the detection path, the measurement path and the reference path may be separate, being connected in parallel to separate inputs of the digital processing module. In this case, the detection path comprises:

a first detection pathway which is dedicated to forming the measurement path, and which comprises a first photodetector arranged to receive the radiations which correspond one-to-one to the pulses emitted by the transmission path after these pulses have been retroreflected or backscattered by the target, this first detection pathway delivering the measurement detection signals; and a second detection pathway, which is separate from the first detection pathway and which is dedicated to forming the reference path, comprising a second photodetector arranged to receive the radiations representative of the pulses as emitted by the transmission path, this second detection pathway delivering the reference detection signals.

The digital processing module is then connected to respective outputs of the first and second detection pathways in order to receive the measurement detection signals and the reference detection signals.

Alternatively, when the LIDAR system is dedicated to measuring distances which are sufficiently large for the measurement detection signals to be temporally separated from the reference detection signals, due to the round-trip propagation delay of the pulses between the LIDAR system and the target, the two functions of measurement path and reference path can be fulfilled by a same common detection pathway within the detection path. The measurement detection signals are then separated from those of the reference detection signals by temporal gates. Such an embodiment of the detection path is economical in terms of components used. In addition, it eliminates processing differences that could exist when the two measurement and reference paths are separate. In other words, in this case the detection path comprises:

a photodetector shared by both functions of measurement path and reference path, which is intended to receive, during separate time windows, the radiations which correspond one-to-one to the pulses emitted by the transmission path after these pulses have been retroreflected or backscattered by the target, and the radiations representative of the pulses as emitted by the transmission path, delivering detection signals during each time window; and a controller, which assigns the detection signals delivered by the shared photodetector, as either measurement detection signals or as reference detection signals, depending on the time windows.

According to a first possible improvement for a LIDAR system according to the invention, the system may be provided with double heterodyne detection, or DHD. This double heterodyne detection improvement makes it possible to increase the signal-to-noise ratio values for each among the measurement path and reference path. For this purpose, the detection path may be optically coupled so as to additionally receive other portions of the radiation from the laser source, on the one hand at a same time as the radiations which correspond one-to-one to the pulses emitted by the transmission path after these pulses have been retroreflected or backscattered by the target, and on the other hand at a same time as the radiations representative of the pulses as emitted by the transmission path. Such a first improvement provides the LIDAR system with greater sensitivity, in particular for uses where the target has a very weak capacity for retroreflection or backscattering.

In this case, the digital processing module may be adapted to mix components of the measurement detection signals which respectively originate from both transfer pathways so as to obtain a product time signal for the measurement path, which is devoid of phase fluctuations of the laser source. Similarly, it may also be adapted to mix components of the reference detection signals which respectively originate from both transfer pathways so as to separately obtain a product time signal for the reference path, which is also devoid of phase fluctuations of the laser source. Then, the digital processing module may calculate the correlation function between the respective product time signals of the measurement path and the reference path. The correlation function is thus not affected by phase noise from the laser source, and has an increased signal-to-noise ratio. A measurement result obtained on the basis of this correlation function is more accurate.

According to a second improvement which is also possible for a LIDAR system according to the invention, the system may be adapted so that each pulse has a spectrum composed of several separate spectral components. In other words, each pulse may have a comb-shaped spectrum. There may be any number of separate spectral components which form such a comb. Such a second improvement makes it possible to further increase the energy of the detection signals without reaching a predetermined threshold for stimulated Brillouin scattering for each spectral component of the comb. The LIDAR system can thus be even more suitable for uses where the target has a very weak capacity for retroreflection or backscattering, or for which the characteristics vary depending on the spectral component.

The first improvement, which concerns the use of double heterodyne detection, can be applied without the second improvement, meaning without the spectrum of each pulse being comb-shaped.

For embodiments which combine both improvements, the transmission path may further comprise:

a first comb generation modulator, arranged to be effective on the components of each pulse which are delivered by both transfer pathways; and a first comb controller, connected so as to control the first comb generation modulator, and configured to apply to this first comb generation modulator a first control signal composed of several first equidistant spectral lines, these first spectral lines being separated by a first increment between any two of said lines which are spectral neighbors.

Simultaneously, the detection path may further comprise:

a second comb generation modulator, arranged to be effective on the so-called other portions of the radiation from the laser source, on the one hand at a same time as the radiations are detected which correspond one-to-one to the pulses emitted by the transmission path after these pulses have been retroreflected or backscattered by the target, and on the other hand at the same time as the radiations are detected which are representative of the pulses as emitted by the transmission path; and a second comb controller, connected so as to control the second comb generation modulator, and configured to apply to this second comb generation modulator a second control signal composed of several second equidistant spectral lines, these second spectral lines being separated by a second increment between any two of said second lines which are spectral neighbors.

A difference between the first and second increments is then greater than a spectral width used to obtain the pulse-compression effect. In addition, the digital processing module is configured to add or average detection signal contributions which relate to different pairs of optical lines, each pair of optical lines being formed by a first optical line produced by the first comb generation modulator and a second optical line produced by the second comb generation modulator.

Again when both improvements are combined, the correlation function may be calculated once again between respective product time signals of the measurement path and the reference path, so as not to be affected by phase noise from the laser source. In this case, the product time signal of the measurement path may be obtained by mixing two comb spectral components which respectively originate from both transfer pathways and have been retroreflected or backscattered by the target, and the product time signal of the reference path may also be obtained by mixing two comb spectral components which respectively orginate from both transfer pathways but which are part of the radiations representative of the pulses as emitted by the transmission path. For this purpose, each mixing is carried out in a manner that eliminates the effect of phase fluctuations of the laser source.

Furthermore, the second improvement, according to which the spectrum of each pulse is comb-shaped, can also be applied without the first improvement, meaning without using double heterodyne detection. In this case, the transmission path may further comprise:

a first comb generation modulator, arranged in one of both transfer pathways so as to be effective on the radiation portion transmitted by this transfer pathway;

a first comb controller, connected so as to control the first comb generation modulator, and configured to apply to this first comb generation modulator a first control signal composed of several first equidistant spectral lines, these first spectral lines being separated by a first increment between any two of said first lines which are spectral neighbors;

a second comb generation modulator, arranged in the other of both transfer pathways so as to be effective on the radiation portion transmitted by this other transfer pathway; and a second comb controller, connected so as to control the second comb generation modulator, and configured to apply to this second comb generation modulator a second control signal composed of several second equidistant spectral lines, these second spectral lines being separated by a second increment between any two of said second lines which are spectral neighbors.

As above, the difference between the first and second increments is still greater than a spectral width used to obtain the pulse-compression effect, and the digital processing module is configured to add or average contributions of detection signals which relate to different pairs of optical lines, each pair of optical lines being formed by a first optical line produced by the first comb generation modulator and a second optical line produced by the second comb generation modulator.

When the second improvement is used, with or without the first improvement, the first and second comb generation modulators may be of the electro-optical modulator type.

BRIEF DESCRIPTION OF FIGURES

The features and advantages of the invention will become more clearly apparent from the detailed description below of some non-limiting exemplary embodiments, with reference to the appended figures in which.

DETAILED DESCRIPTION OF THE INVENTION

Figure 1A:
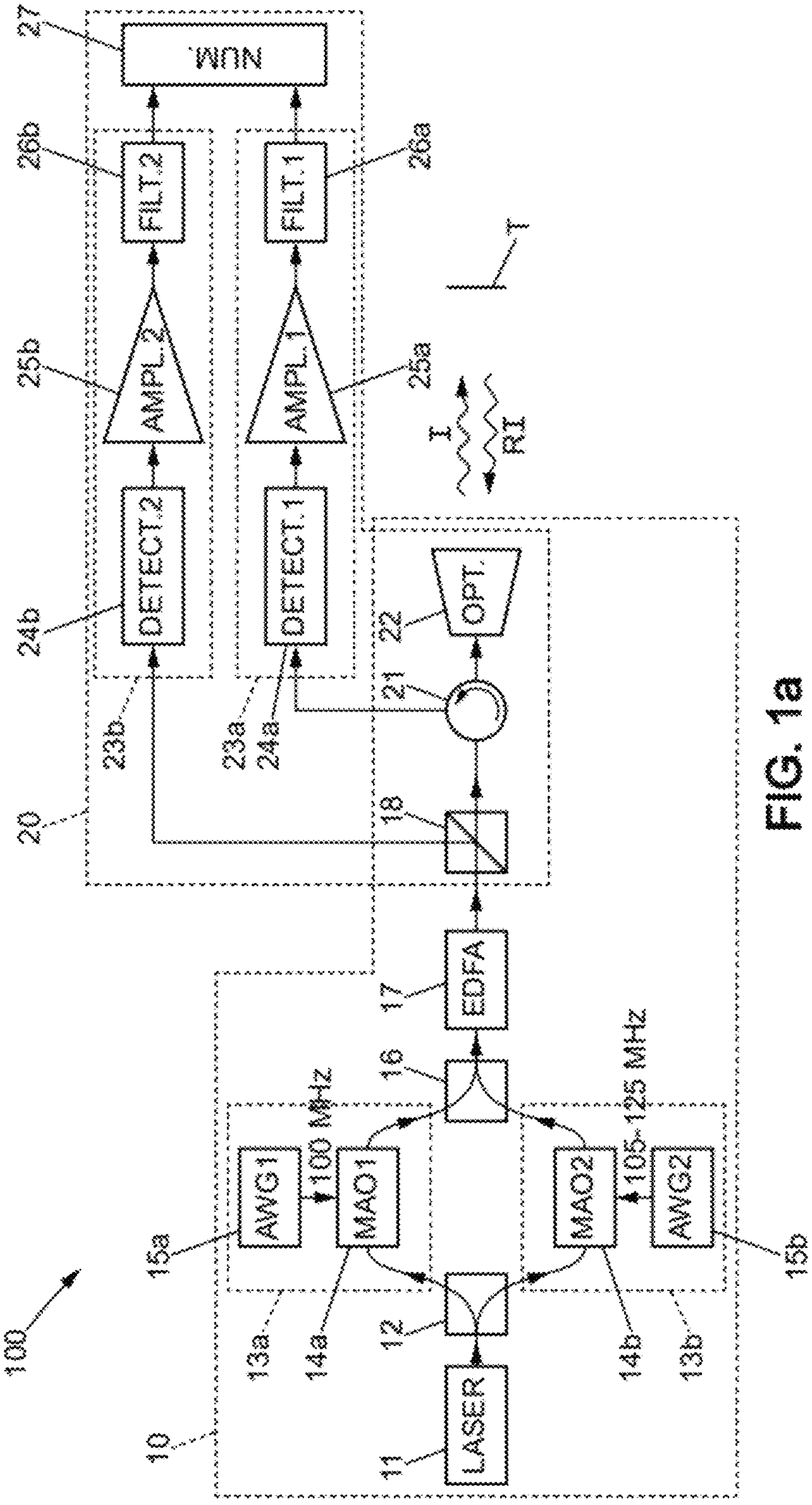
FIG. 1*a* is a block diagram of a first LIDAR system according to the invention, without the optional improvements of double heterodyne detection or a comb-shaped pulse spectrum.

In these figures, all elements are only represented symbolically. In addition, identical references indicated in different figures designate elements which are identical or have identical functions.

For all embodiments of the invention which are described below, the reference 100 designates a LIDAR system according to the invention, and the references 10 and 20 respectively designate its transmission path and its detection path. Transmission path 10 comprises the following components: a laser source 11, a first coupler 12, a first transfer pathway 13*a*, a second transfer pathway 13*b*, a second coupler 16, an optical amplifier 17, an amplitude-division beamsplitter 18, an optical circulator 21, and emission optics 22 denoted OPT. All of these components of transmission path 10 may be implemented using optical fiber technology. In such case, laser source 11 may be designed to produce radiation at approximately 1560 nm (nanometers), couplers 12 and 16 may be "Y" evanescent field couplers, and optical amplifier 17 may be of the EDFA type ("Erbium-Doped Fiber Amplifier"). Beamsplitter 18 may have an output intensity ratio of 95%-5% for example, its output at 95% intensity being dedicated to transmission path 10 towards emission optics 22 through optical circulator 21, and its output at 5% intensity being dedicated to transmitting a portion of the radiation produced by transmission path 10 to a reference path 23*b* of detection path 20.

Transmission path 10 is a double probe beam, or DPB: it is adapted to emit, towards a target T which is external to LIDAR system 100, pulses I of radiation which have at least two spectral components of different respective optical frequency values. For this purpose, first transfer pathway 13*a* may comprise a first modulator 14*a* and a first electrical signal generator 15*a*. Similarly, second transfer pathway 13*b* may comprise a second modulator 14*b* and a second electrical signal generator 15*b*. Both modulators 14*a* and 14*b* may each be an acousto-optic type of modulator, and for this reason are denoted MAO1 and MAO2, respectively. Both electrical signal generators 15*a* and 15*b* may each be of the arbitrary waveform generator type, and for this reason are denoted AWG1 and AWG2, respectively. An electrical output of generator 15*a* (respectively 15*b*) is connected to a modulation input of modulator 14*a* (resp. 14*b*) so that a portion of the radiation which comes from laser source 11 and which is transmitted by transfer pathway 13*a* (resp. 13*b*) is modified by modulator 14*a* (resp. 14*b*) in accordance with the electrical signal produced by generator 15*a* (resp. 15*b*). Both transfer pathways 13*a* and 13*b* are arranged in parallel between couplers 12 and 16, and these couplers are selected so that each transfer pathway transmits approximately half of the energy of the radiation produced by laser source 11.

Electrical signal generators 15*a* and 15*b* may be programmed to divide the radiation which originates from laser source 11 into successive pulses, so that each pulse I which leaves optical amplifier 17 is composed of two components of synchronized pulses, one delivered by transfer pathway 13*a* and the other delivered by transfer pathway 13*b*.

Generator 15*a* may further be programmed to deliver, during each time window which corresponds to a pulse I, a first sinusoidal electrical signal which causes an optical frequency increase of 100 MHz (megahertz), for example, for the component pulse delivered by transfer pathway 13*a*.

Simultaneously, generator 15*b* may further be programmed to deliver a second electrical signal which causes an optical frequency modulation for the pulse component delivered by transfer pathway 13*b*. In particular, this second electrical signal may be sinusoidal with a frequency which increases continuously during each time window which corresponds to a pulse I, from 105 MHz at the start of the pulse to 125 MHz at the end of the pulse for example. Thus, the optical frequency of the pulse component which is delivered by transfer pathway 13*b* is increased according to an increment which varies gradually from 105 MHz to 125 MHz during each pulse I, relative to the radiation as received as input by transfer pathway 13*b*. The speed of variation of this optical frequency over time may be substantially constant over the duration of each pulse I.

Detection path 20 shares optics 22, optical circulator 21, and beamsplitter 18 with transmission path 10. It further comprises two detection pathways 23*a* and 23*b*, and a digital processing module 27 denoted NUM. Detection pathway 23*a* is intended to form a measurement path: its optical input is connected to the output of circulator 21 which is dedicated to detection path 20. It comprises, in order: a photodetector 24*a* denoted DETECT. 1, an amplifier 25*a* denoted AMPL. 1, and a filter 26*a* denoted FILT. 1. Thus, measurement path 23*a* receives, as input, pulse I portions RI which have been retroreflected or backscattered by target T, and these pulse portions RI are detected by photodetector 24*a*. Photodetector 24*a* then produces a measurement detection signal which is amplified, filtered, then transmitted to a first input of digital processing module 27. In parallel, detection pathway 23*b* is intended to form a reference path: its optical input is connected to the output of beamsplitter 18 which is dedicated to detection path 20. It comprises, in order: a photodetector 24*b* denoted DETECT. 2, an amplifier 25*b* denoted AMPL. 2, and a filter 26*b* denoted FILT. 2. Thus, reference path 23*b* receives, as input, pulse I portions as emitted by LIDAR system 100 toward target T, and these portions of pulses I are detected by photodetector 24*b*. The latter then produces a reference detection signal which is amplified, filtered, then transmitted to another input of digital processing module 27. For the numerical values cited in this description, filters 26*a* and 26*b* which are analog low-pass filters can have a cutoff frequency of around 150 MHz-200 MHz, to eliminate aliasing.

LIDAR system 100 of FIG. 1*a*, with double probe beam (DPB), does not use double heterodyne detection and is said to have direct detection. The signals transmitted separately by measurement path 23*a* and by reference path 23*b* each consist of a superposition of two components of pulse portions RI which have the same propagation delay relative to the emission from laser source 11. The superposition of these two components in each of measurement path 23*a* and reference path 23*b* is therefore not sensitive to phase fluctuations of laser source 11. Such phase fluctuations of laser source 11 as present in each component of pulse portions RI then disappear automatically at the time of their beat in the photodetector, the latter producing a signal whose instantaneous phase is equal to the phase difference of both spectral components.

During operation of LIDAR system 100, digital processing module 27 calculates a correlation function between the measurement detection signal that is output via measurement path 23*a* and the reference detection signal that is output via reference path 23*b*. In practice, such correlation signals are calculated for several pulses I which are emitted successively, then the powers of all the correlation signals, meaning their squared moduli, are accumulated. The measurement result for the distance from target T is then equal to half of the time shift which corresponds to the maximum of the cumulative correlation power function. Indeed, this time shift of the maximum is equal to the round trip time-of-flight of the radiation between LIDAR system 100 and target T.

In the operation just described, modulator 14*b* and digital processing module 27 together produce a pulse-compression effect. For this reason, modulator 14*b* and generator 15*b* have been respectively referred to as pulse-compression modulator and pulse-compression controller in the general portion of this description. Due to this pulse-compression effect, the result of the correlation function which is delivered by module 27 presents an increased a signal-to-noise ratio, for an equal value of cumulative energy of the pulses I used to perform a distance measurement. This increase in the signal-to-noise ratio appears in a factor B-T compared to a LIDAR system without pulse compression, where B is the spectral width of modulation controlled by generator 15*b* and T is the duration of each pulse I. In the example described, B is equal to 125 MHz-105 MHz=20 MHz and T can be equal to 1 ms (millisecond), producing a pulse-compression factor that is equal to 20,000. There is a resulting improvement to the distance resolution which LIDAR system 100 provides, that is equivalent to the use of ultra-short pulses which would have individual durations of approximately 80 ns (nanoseconds). According to another point of view, the pulse-compression effect makes it possible to reduce the total energy of pulses I emitted in order to perform a distance measurement, for the same value of the signal-to-noise ratio. Such a reduction allows the peak power of each pulse I to remain below a stimulated Brillouin scattering threshold relative to transmission path 10, and/or allows reducing the number of pulses I required to perform a distance measurement. In the case of the latter alternative, the pulse-compression effect allows reducing the length of time required to perform a distance measurement.

Figure 1B:
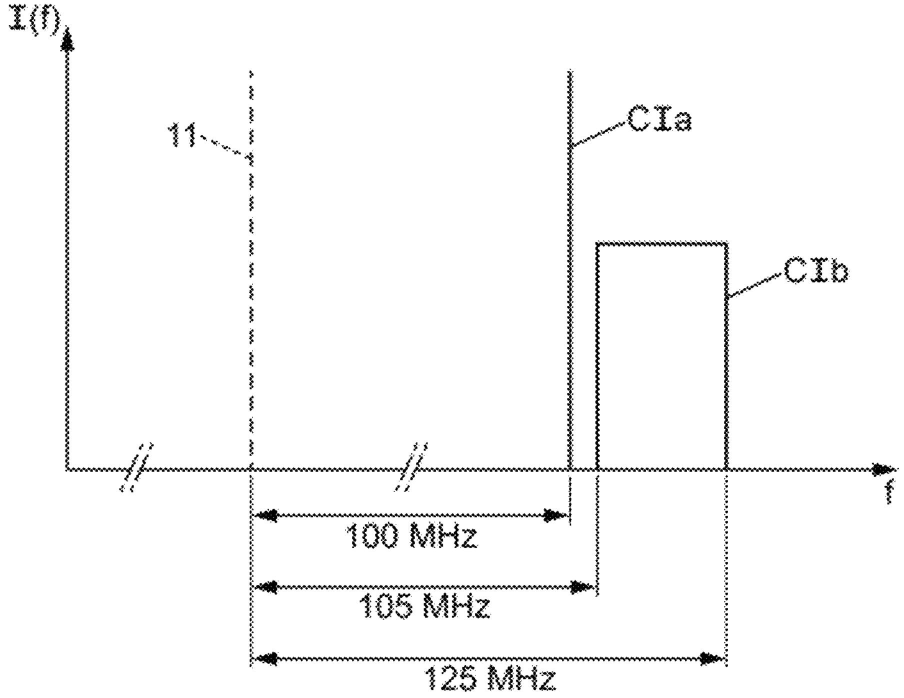
FIG. 1*b* is the spectral diagram of the radiation portions received as input by a detection path of the first LIDAR system of FIG. 1*a;*

LIDAR system 100 of FIG. 1*a* has the composition just described, while lacking the improvements of double heterodyne detection and a comb-shaped pulse spectrum. FIG. 1*b* shows the spectrum of the radiation portions which are received as input by measurement path 23*a* and by reference path 23*b*. These two radiation portions have the same spectrum, or substantially the same spectrum, because the one received by measurement path 23*a* is only distinguishable from the one received by reference path 23*b* on the one hand by the radiation propagation delay between emission optics 22 and target T, if the latter is stationary relative to LIDAR system 100, and on the other hand by the difference in amplitude between the two radiation portions, that received by the measurement path being much weaker than that received by the reference path, due to the additional atmospheric travel. Each of these radiation portions is composed of the superposition of the pulse components delivered by transfer pathway 13*a*, which are denoted Cla and which are spectrally shifted by 100 MHz relative to the radiation from laser source 11 in the example considered, and by the pulse components delivered by transfer pathway 13*b*, which are denoted Clb and which occupy a spectral band shifted by 105 MHz to 125 MHz relative to the radiation of laser source 11. In the diagram of FIG. 1*b*, the horizontal axis identifies the values of the optical frequency, denoted f, the vertical axis identifies the spectral intensity values, denoted I(f), and the reference 11 designates the spectral position of the laser emission from source 11. For each among measurement path 23*a* and reference path 23*b*, the detection signal which is delivered to digital processing module 27 corresponds to the interference between pulse components Cla and Clb.

Figure 2A:
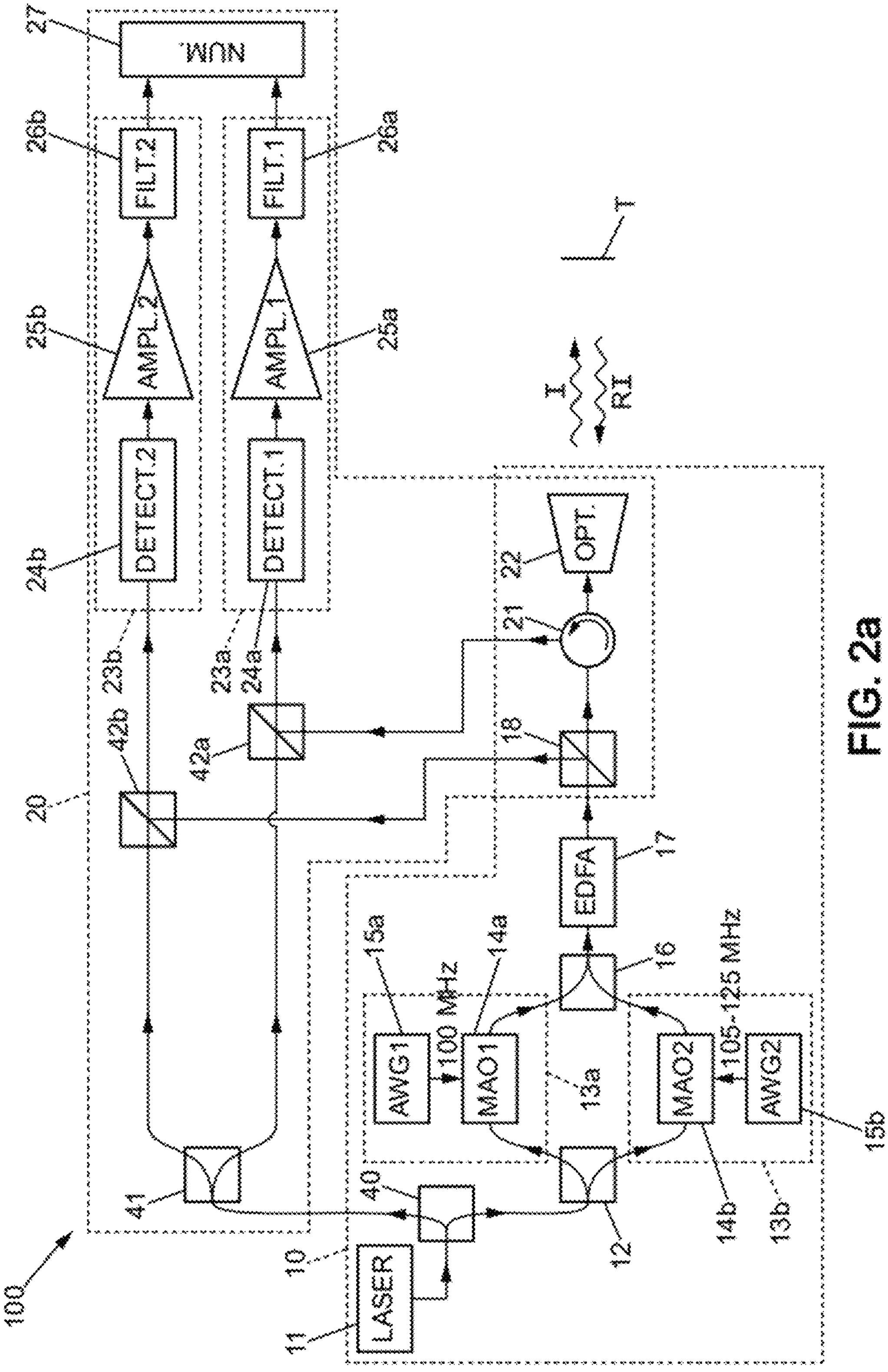
FIG. 2*a* corresponds to FIG. 1*a* for a second LIDAR system according to the invention, which implements the improvement of double heterodyne detection, but without the improvement of the comb-shaped pulse spectrum.

LIDAR system 100 of FIG. 2*a* corresponds to that of FIG. 1*a*, but is supplemented to implement double heterodyne detection (DHD). Double heterodyne detection has the effect of increasing the value of the signal-to-noise ratio in each of the measurement paths 23*a* and reference paths 23*b*, but the mixing of the signals between these two paths can be degraded by the phase fluctuations of laser source 11, when the distance from target T becomes comparable to or greater than half the coherence length of laser source 11. For this purpose, a portion of the radiation produced by laser source 11 is collected at its output by a beamsplitter 40, the collection of a minor portion of the radiation being sufficient. This collected radiation portion, commonly called a local oscillator signal in the jargon of those skilled in the art, is then divided in two for transmission in parallel to the optical inputs of measurement path 23*a* and reference path 23*b*. For example, beamsplitter 40 can be coupled by evanescent fields. A beamsplitter which divides the intensity in a 50%-50% ratio, designated by the reference 41, is used to divide the radiation portion collected from laser source 11 into two sub-beams. Another beamsplitter 42*a*, used to perform a beam combining function, is arranged so as to superpose one of the two sub-beams coming from beamsplitter 11 with pulse portions RI which come from circulator 21, after these pulse portions RI have been retroreflected or backscattered by target T. Yet another beamsplitter 42*b*, also used to perform the beam combining function, is arranged to superpose the other of the two sub-beams coming from beamsplitter 41 with radiation portions which come from beamsplitter 18, and which are representative of pulses I as emitted by LIDAR system 100 towards target T. With such an arrangement, photodetector 24*a* performs a heterodyne detection of pulse portions RI, and photodetector 24*b* independently performs a heterodyne detection of emitted pulses I.

Figure 2B:
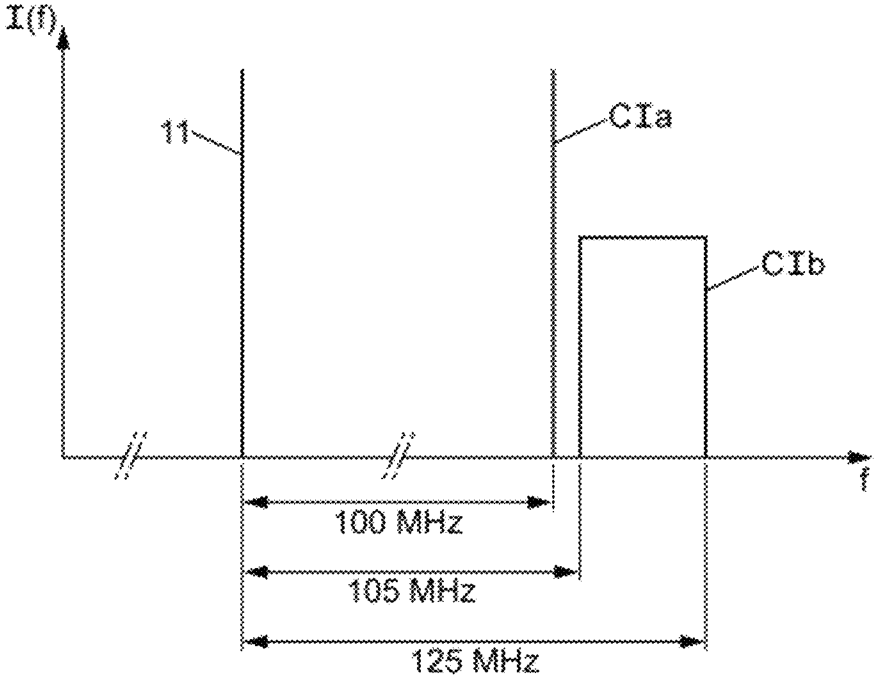
FIG. 2*b* corresponds to FIG. 1*b* for the second LIDAR system of FIG. 2*a;*

FIG. 2*b* shows the spectrum of the radiation portions received as input by measurement path 23*a* and by reference path 23*b*, for LIDAR system 100 of FIG. 2*a*. These two radiation portions still have the same spectrum, or substantially the same spectrum, for the same reasons as those indicated above. However, this spectrum is now composed of the superposition of pulse components Cla and Clb, with in addition a monochromatic component which corresponds to the emission from laser source 11, and which is again designated by the reference 11 in the spectral diagram. The relative positions of the three components 11, Cla, and Clb are indicated, and correspond to the indications already present in FIG. 1*b*.

Figure 2C:
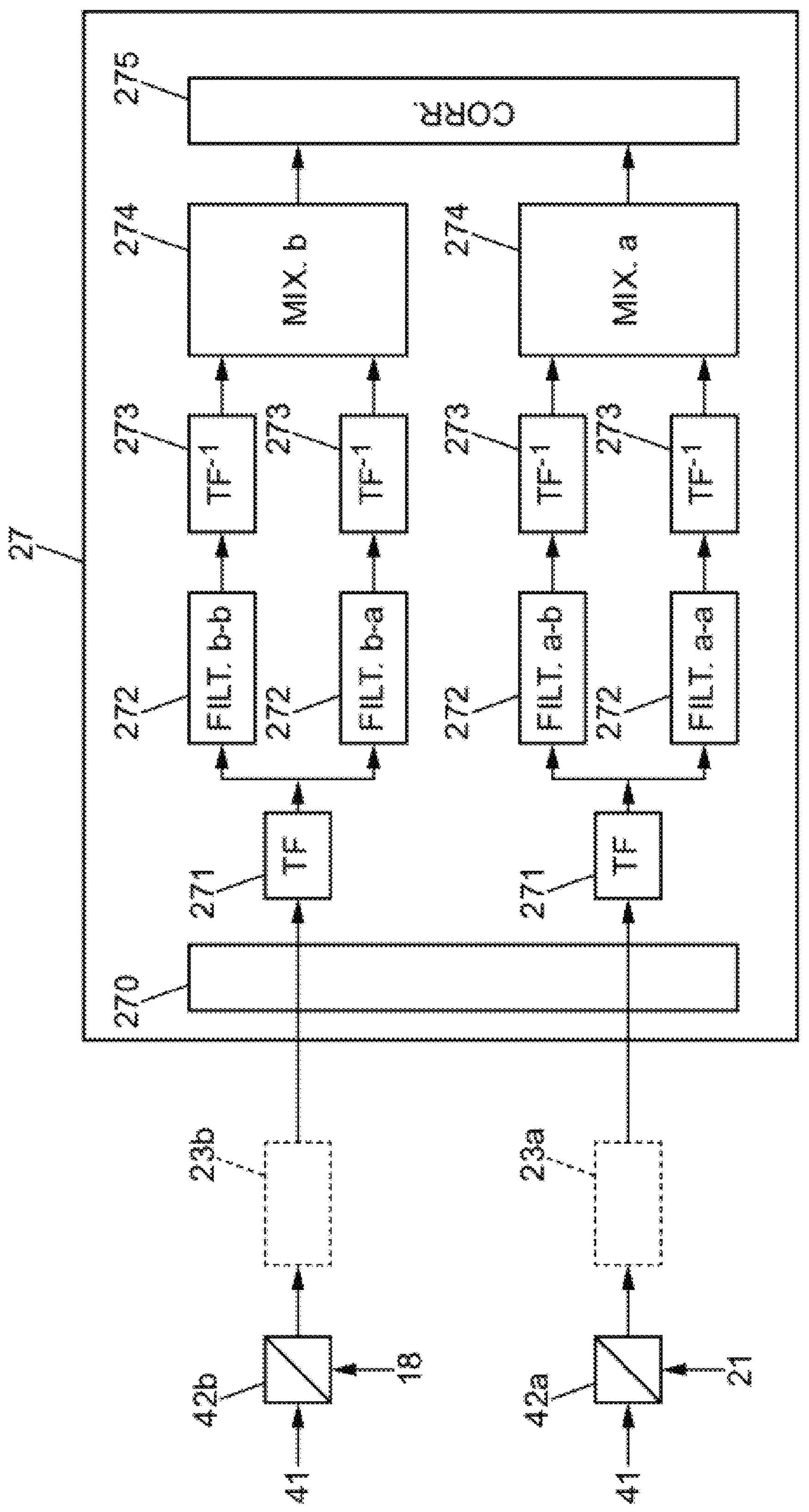
FIG. 2*c* shows details of a digital processing module that can be used in the second LIDAR system of FIG. 2*a;*

FIG. 2*c* symbolically shows the main signal processing steps which are carried out in digital processing module 27. The reference 270 designates digitizations of the signals delivered separately by measurement path 23*a* and by reference path 23*b*, carried out at the input of module 27. Fourier transformations, denoted TF and designated by the references 271, are then carried out independently on the measurement detection signal coming from measurement path 23*a*, and on the reference detection signal coming from reference path 23*b*. The references 272 designate digital spectral filters. The two filters 272 which are denoted FILT. a-a and FILT. a-b are band-pass filters and select the positive frequencies of component Cla and component Clb respectively, as these two components appear in FIG. 2*b*. For example, the spectral window of filter FILT. a-a is 97 MHz to 103 MHz, and that of filter FILT. a-b is 103 MHz to 128 MHz. The references 273 designate inverse Fourier transformations, which are carried out in parallel on the signals delivered by filters 272, and denoted $TF^{-1}$. For the measurement detection signal, mixer 274 denoted MIX. a calculates the product of filtered component Cla and the complex conjugate of filtered component Clb, for each instant of the measurement detection signal. The product time signal which is thus obtained for measurement path 23*a* is then devoid of the phase fluctuations of laser source 11. The reference detection signal is processed in parallel in the same manner. Filters FILT b-a and FILT. b-b have the same spectral windows as filters FILT. a-a and FILT. a-b respectively, and mixer 274 denoted MIX. b calculates the product of filtered component Cla and the complex conjugate of filtered component Clb, this time for each instant of the reference detection signal. The product time signal which is thus obtained for reference path 23*b* is similarly devoid of the phase fluctuations of laser source 11. Module 275, denoted CORR., then calculates the correlation function between the two product time signals from measurement path 23*a* and reference path 23*b* respectively. The technique described here is suitable for non-real time processing, but it is possible to carry out equivalent operations in real time, by other digital filtering techniques known to those skilled in the art, for example by using FIR filters (Finite Impulse Response), or IIR filters ("Infinite Impulse Response").

Figure 3A:
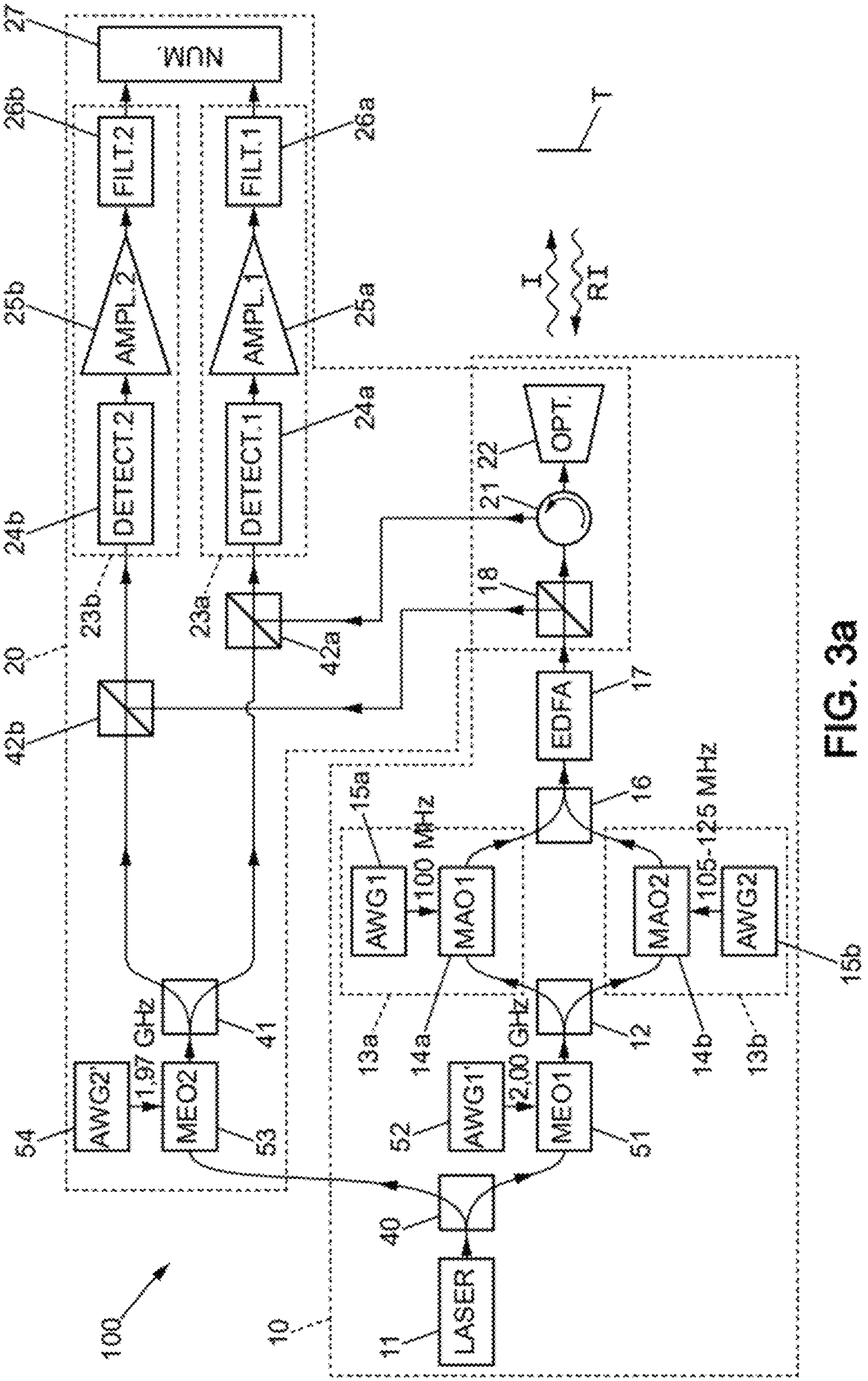
FIG. 3*a* corresponds to FIG. 1*a* for a third LIDAR system in accordance with the invention, which implements both improvements of double heterodyne detection and a comb-shaped pulse spectrum.

LIDAR system 100 of FIG. 3*a* corresponds to the one of FIG. 2*a*, but is further supplemented to also make use of the improvement of comb-shaped spectrum for the pulses I. To this purpose, two additional modulators are added to LIDAR system 100: a first additional modulator 51 on the radiation path between beamsplitters 40 and 12, and a second additional modulator 53 on the radiation path between beamsplitters 40 and 41. In other words, second additional modulator 53 is inserted so as to be effective on the local oscillator signal. The two additional modulators 51 and 53 can be of the electro-optical type, and are denoted MEO1 and MEO2 respectively. Each of modulators 51 and 53 is associated with an electrical signal generator, of which an electrical output is connected to a modulation input of the modulator: an electrical output of generator 52 (respectively 54) is connected to the modulation input of modulator 51 (resp. 53). The two generators 52 and 54 may be of the AWG type, and for this reason are denoted AWG1' and AWG2', respectively. They are programmed to produce electrical signals which are each composed of a sum of several sinusoidal components. Thus, modulator 51 transforms the radiation transmitted from laser source 11 to the two transfer pathways 13*a* and 13*b* into a superposition of several monochromatic or quasi-monochromatic spectral components, such that the spectrum of this radiation has comb shape. For this reason, modulator 51 has been referred to as the first comb generation modulator in the general part of this description, and generator 52 has been referred to as the first comb controller. For example, the electrical signal applied by generator 52 to modulator 51 can be such that the radiation which is transmitted to the two transfer pathways 13*a* and 13*b* is composed of five monochromatic spectral components separated by 2.00 GHz (gigahertz), in terms of optical frequency. Those skilled in the art describe such a spectral composition as a frequency mini-comb.

Within transfer pathway 13*a*, modulator 14*a* applies a shift of +100 MHz to the entire mini-comb of each pulse I, which is generated by modulator 51.

Simultaneously, within transfer pathway 13*b*, modulator 14*b* applies a modulation according to an optical frequency increment which varies from +105 MHz to +125 MHz to the entire mini-comb of each pulse I, which is generated by modulator 51.

Figure 3B:
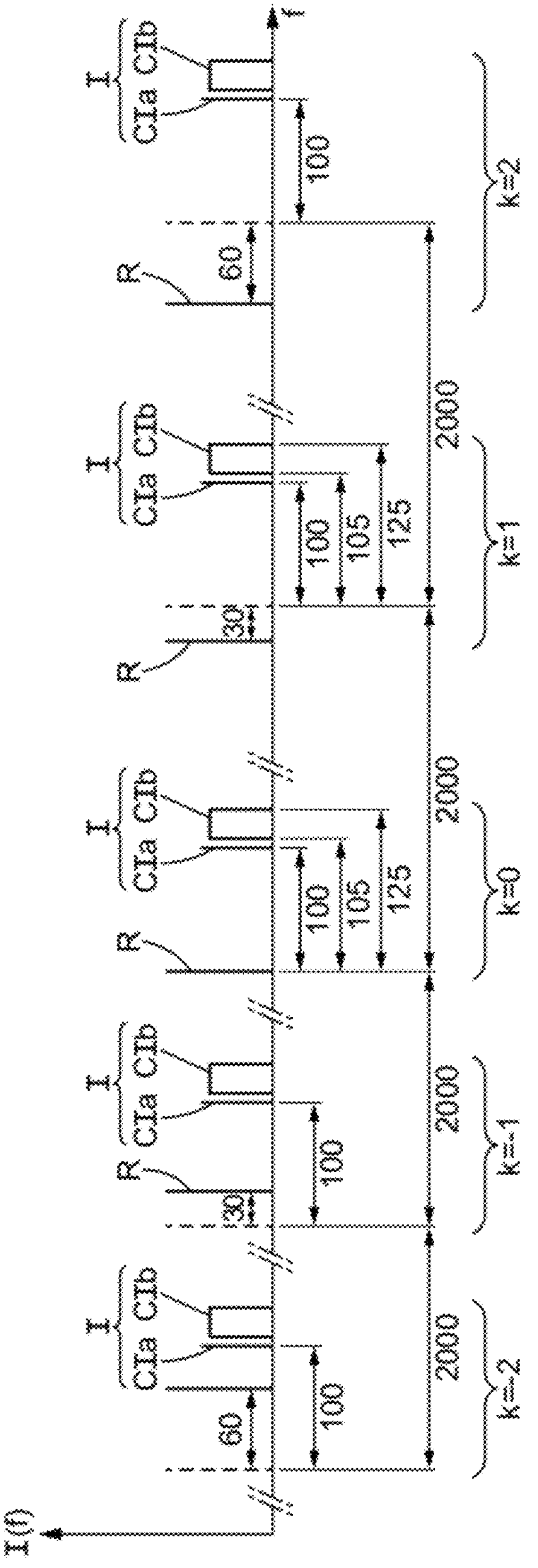
FIG. 3*b* corresponds to FIG. 2*b* for the third LIDAR system of FIG. 3*a;*

The spectral composition of pulses I emitted by LIDAR system 100 of FIG. 3*a*, and which are detected by reference path 23*b*, is indicated in the diagram of FIG. 3*b* by the brackets designated by the letter I. It is composed of five spectral patterns which are each identical to the one in FIG. 2*b*, and which are separated by 2000 MHz between neighboring patterns. All frequency deviation values shown in this diagram are expressed in megahertz. This spectral composition is still substantially identical to that of pulse portions RI which have been retroreflected or backscattered by target T, and which are detected by measurement path 23*a*.

Modulator 53 transforms the radiation portions transmitted from laser source 11 to measurement path 23*a* and to reference path 23*b* into two identical superpositions of several monochromatic or quasi-monochromatic spectral components, such that the spectrum of these radiation portions again has a comb shape. Modulator 53 has been referred to as the second comb generation modulator in the general part of this description, and generator 54 the second comb controller. For the example embodiments in FIG. 3*a*, the electrical signal applied by generator 54 to modulator 53 can be such that the comb of the radiation portions transmitted to the two measurement 23*a* and reference 23*b* paths is composed of five monochromatic spectral components spaced apart by 1.97 GHz, in terms of optical frequency.

Under these conditions, for the spectrum of the radiation portions which are received as input by measurement path 23*a* and by reference path 23*b*, double heterodyne detection combined with the use of mini-combs adds the five components which are designated by the letter R in the diagram of FIG. 3*b*.

Figure 3C:
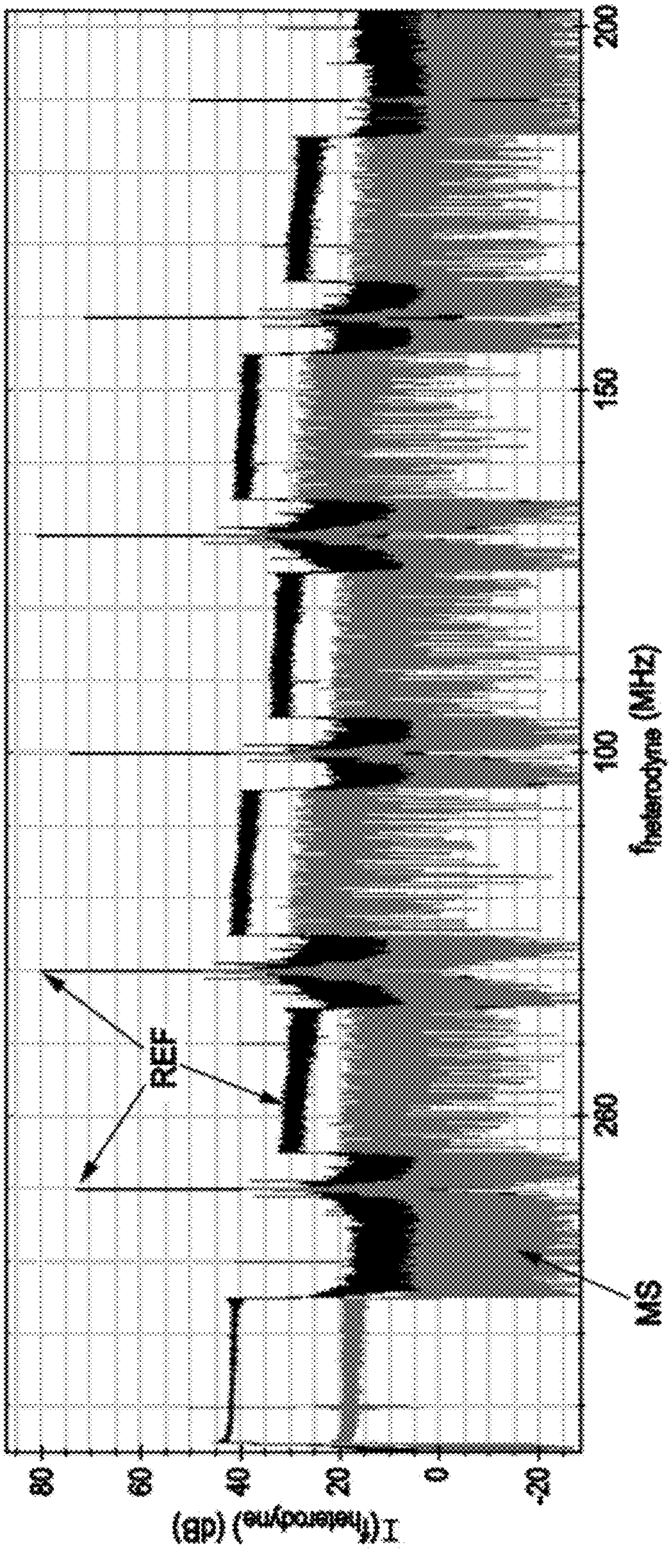
FIG. 3*c* is a spectral diagram relating to detection signals of the third LIDAR system of FIG. 3*a;*

For each heterodyne detection carried out in measurement path 23*a* or in reference path 23*b*, each monochromatic component R interferes with monochromatic component Cla which results from modulators 51 and 14*a* and which is closest thereto, generating detection signal components at 40 MHz, 70 MHz, 100 MHz, 130 MHz, and 160 MHz, meaning at 100 MHz+k·30 MHz, where k is an index which takes the values −2, −1, 0, +1, and +2 to identify the comb components. Simultaneously, each monochromatic component R additionally interferes with modulated component Clb which results from modulators 51 and 14*b* and which also is closest thereto, generating five additional detection signal components which extend respectively between 105 MHz+k·30 MHz and 125 MHz+k·30 MHz, where k is the same index as before. The lower graph in the spectral diagram of FIG. 3*c*, designated by MS, corresponds to the measurement detection signal which is thus delivered by measurement path 23*a* to digital processing module 27, and the upper graph in the same diagram of FIG. 3*c*, designated by REF, shows the reference detection signal which is simultaneously delivered by reference path 23*b* to module 27. In this diagram, the horizontal axis identifies the frequency values for the heterodyne detection signals, denoted $f_{heterodyne}$ and expressed in megahertz, and the vertical axis identifies the corresponding spectral intensities, denoted $I(f_{heterodyne})$ and expressed in decibels. Because of the disruptions undergone by pulses I during their propagation between emission optics 22 and target T, the measurement detection signal (lower graph) has a coherence which is lower than that of the reference detection signal (upper graph): higher noise level and peaks that aren't as thin. In the example described, the other spectral components of the measurement detection signal (respectively the reference detection signal) which result from interference between comb teeth associated with different values for the index k, are eliminated by filter 26*a* (resp. 26*b*). The inventors further specify that the spectra of FIG. 3*c* were obtained experimentally. This is why they contain some parasitic lines which do not result directly from the use of the invention.

Figure 3D:
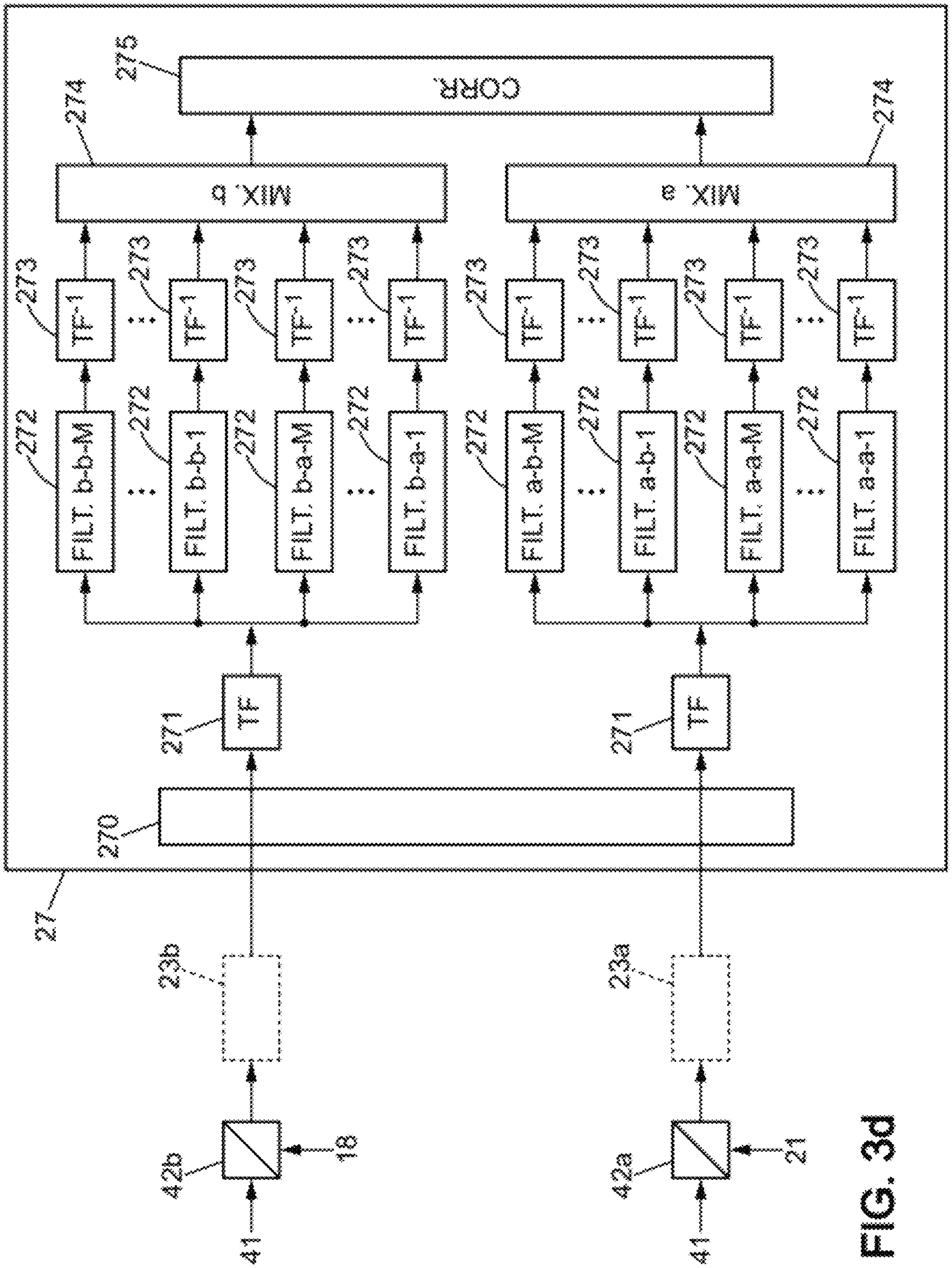
FIG. 3*d* corresponds to FIG. 2*c* for the third LIDAR system of FIG. 3*a;*

Digital processing module 27 stores the measurement and reference detection signals, independently of each other, for a series of pulses I which are emitted successively, for example one hundred successive pulses I. The processing steps which are carried out by module 27 of FIG. 3*d* relating to LIDAR system of FIG. 3*a* are of the same type as those shown in FIG. 2*c* relating to the LIDAR system of FIG. 2*a*. Module 27 first calculates the spectrum of the measurement detection signal by applying a Fourier transformation with respect to time (references 271), then filters (references 272) within this spectrum the components centered at 100 MHz+k·30 MHz (filters FILT. a-a-1 to filters FILT. a-a-M), as well as the components which are comprised within 105 MHz+k·30 MHz and 125 MHz+k·30 MHz (filters FILT. a-b-1 to filters FILT. a-b-M), where k is again the index introduced above whose values are −2, −1, 0, +1, and +2, for M equal to 5. An inverse Fourier transformation is then applied to each filtered component (references 273), then, separately for each value of k, the time signal of filtered component Cla is multiplied by the complex conjugate of the time signal of filtered component Clb (reference 274). M product time signals are thus obtained for measurement path 23*a*, where M is again the number of monochromatic spectral components in the mini-comb of each pulse I. M product time signals are obtained in the same manner, independently and in parallel, for reference path 23*b* using filters FILT. b-a-1 to FILT. b-a-M and FILT. b-b-1 to FILT. b-b-M. Module 275 then calculates a square matrix M×M of intercorrelations, for which the correlation function which is located in column k and row k' in this matrix is relative to the product time signal of measurement path 23*a* for component k of the mini-comb and to the product time signal of reference path 23*b* for component k' of the mini-comb. $M^2$ evaluations are thus obtained for the distance away from target T by the respective maxima of all the correlation functions, and a weighted average of these $M^2$ distance evaluations provides a measurement result which has reduced noise. In particular, the weighting can take into account the variations in the signal-to-noise ratio of the $M^2$ available evaluations.

In an alternative operation, the components which come from filters FILT. a-a-1 to FILT. a-a-M can be spectrally superposed by digitally removing the shifts of k·30 MHz, then added or averaged together, as can those which come from filters FILT. a-b-1 to FILT. a-b-M. The same processing is carried out independently for the reference detection signal: the components which come from filters FILT. b-a-1 to FILT. b-a-M are spectrally superposed on the one hand by digitally removing the shifts of k·30 MHz, then added or averaged together, and on the other hand, those which come from filters FILT. b-b-1 to FILT. b-b-M are superposed then added or averaged together in the same manner. An operation which is identical to the one in FIG. 2*c* can then be implemented from that starting point. This operation comprises the use of two mixers 274 MIX. a and MIX. b to eliminate the phase fluctuations of laser source 11. The result of the correlation function then presents a very narrow peak whose reduced width results from the effect of pulse compression combined with that of coherent superposition of the mini-comb spectral components. As above, the temporal position of this peak is equal to the round-trip propagation duration of pulses I between emission optics 22 and target T. Such a correlation function calculation can be carried out in a particularly economical manner, in particular by using a dedicated electronic module.

Optionally, the spectrum which is obtained for the measurement detection signal, respectively reference detection signal, can be frequency shifted in its entirety so as to become centered relative to the zero frequency. Then each reconstructed detection signal, measurement and reference, which has thus been centered on the zero frequency, has an instant where its instantaneous frequency of variation cancels out. The difference between the frequency cancellation instant obtained for the reconstructed measurement detection signal, and the frequency cancellation instant obtained for the reconstructed reference detection signal, corresponds to the round-trip propagation duration of pulses I between emission optics 22 and target T.

Figure 4A:
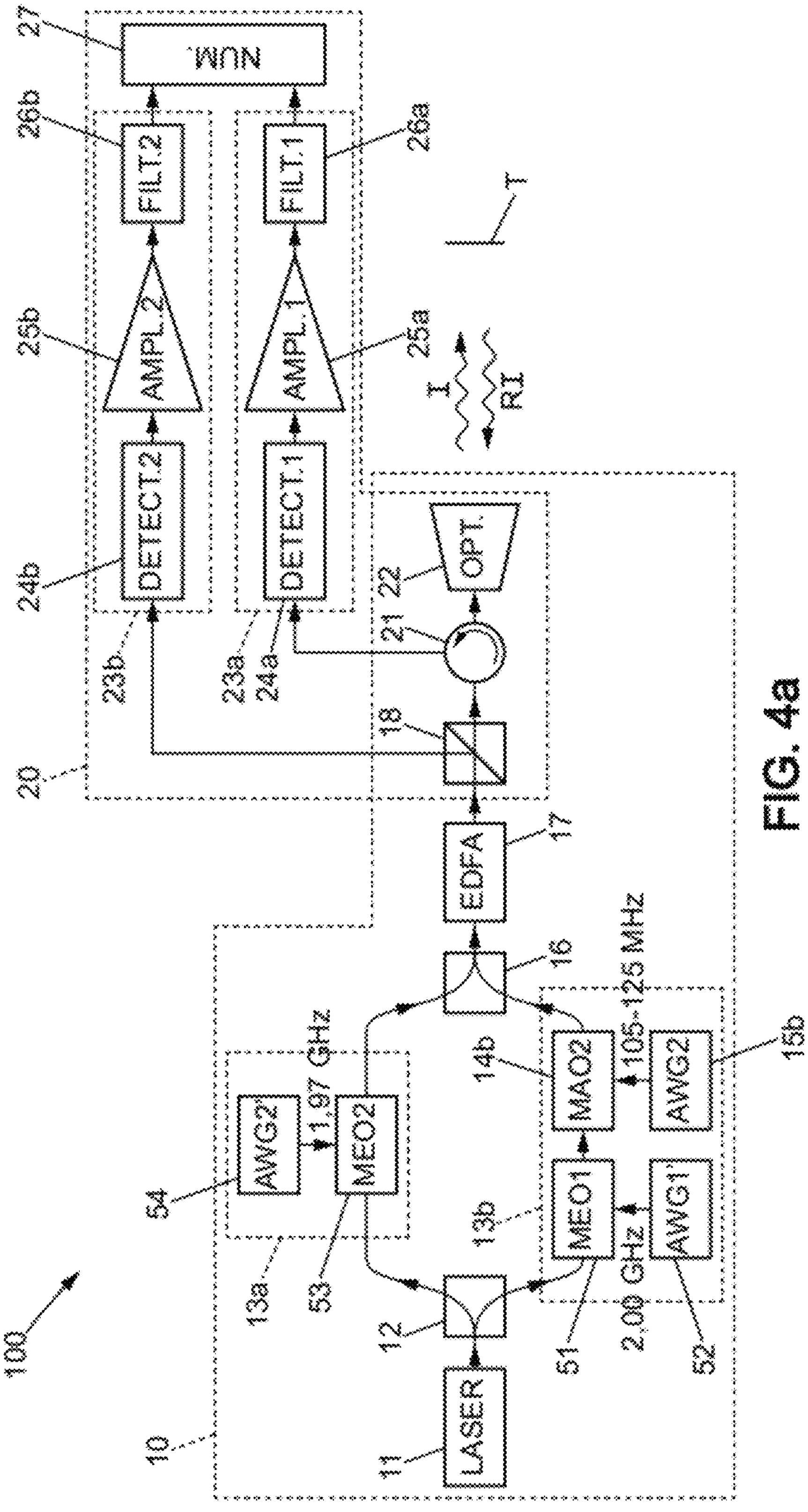
FIG. 4*a* corresponds to FIG. 1*a* for a fourth LIDAR system in accordance with the invention, which implements the improvement of a comb-shaped pulse spectrum, but without the improvement of double heterodyne detection.

LIDAR system 100 of FIG. 4*a* incorporates the improvement of the comb-shaped spectrum of pulses I but without that of double heterodyne detection. It therefore is a direct detection system and is obtained from the embodiment of FIG. 1*a* by removing modulator 14*a* and generator 15*a*, and incorporating comb generation modulator 53 and comb control generator 54 in their place in transfer pathway 13*a*. Comb generation modulator 51 is now inserted into transfer pathway 13*b*, in series with pulse-compression modulator 14*b*. The two comb generation modulators 51 and 53 are associated with their respective comb controllers: modulator 51 with generator 52 in order to generate a comb-shaped spectrum with an increment of 2.00 GHz for example, and modulator 53 with generator 54 to generate another comb-shaped spectrum with a different increment, for example equal to 1.97 GHz. Pulse-compression modulator 14*b* may be identical to the one in the previous embodiments, with controller 15*b* for controlling a modulation according to an optical frequency increment which varies from 105 MHz to 125 MHz.

As with the LIDAR system of FIG. 1*a*, the result of the correlation function of the LIDAR system of FIG. 4*a* is not sensitive to phase fluctuations of laser source 11.

Figure 4B:
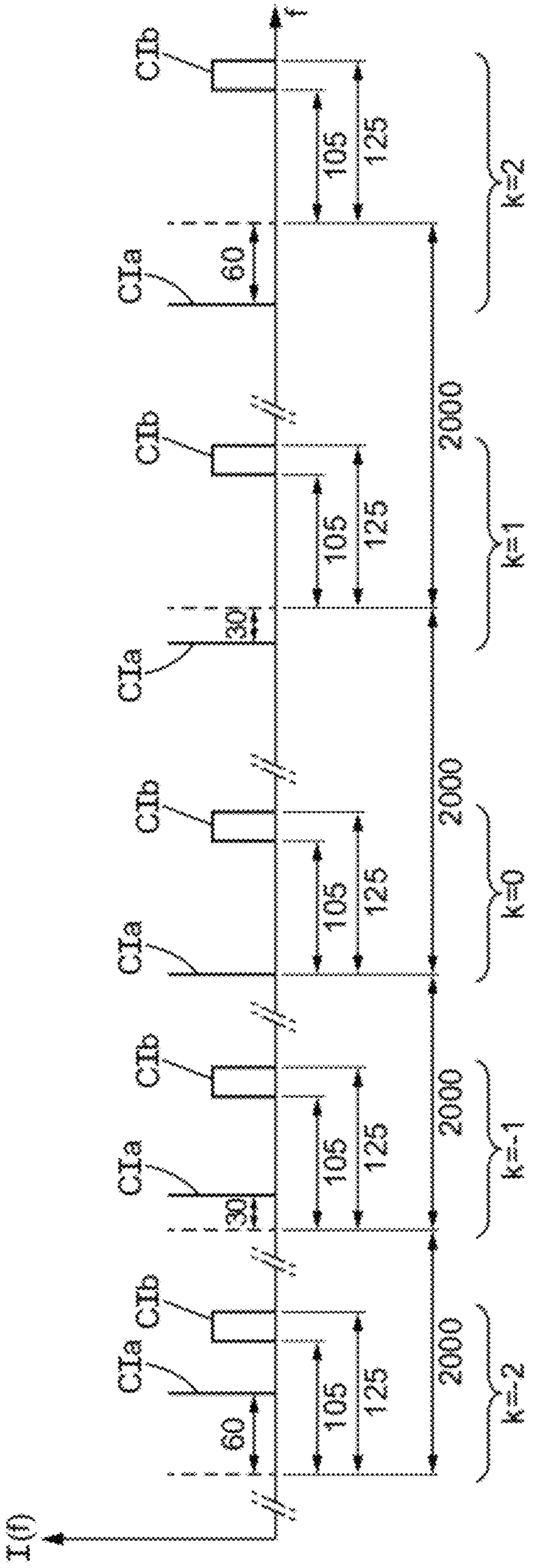
FIG. 4*b* corresponds to FIG. 1*b* for the fourth LIDAR system of FIG. 4*a*.

The diagram of FIG. 4*b* corresponds to that of FIG. 3*b* for the embodiment of FIG. 4*a*. In accordance with the elimination of double heterodyne detection, all the spectral components correspond to pulses I. Components Cla correspond to the mini-comb which is generated in transfer pathway 13*a*, with the optical frequency increment being equal to 1.97 GHz, and components Clb are the ones generated in transfer pathway 13*b*. The latter result from a convolution of the mini-comb which has an optical frequency increment equal to 2.00 GHz with the pulse-compression modulation produced by modulator 14*b*. The measurement (respectively reference) detection signal as delivered by filter 26*a* (resp. 26*b*) is a coherent superposition of the interferences of each monochromatic component Clb with the modulated component Cla which is spectrally closest thereto.

Although the operation of digital processing module 27 has been described for the most complex case, corresponding to the embodiment of FIG. 3*a*, those skilled in the art will be able to adapt it to other embodiments without demonstrating inventive activity. In particular, the final step of averaging the distance evaluations, or the step of adding or averaging the spectral components which correspond to different values of index k, disappears when the improvement of a comb-shaped spectrum of each pulse I is not implemented.

It is understood that the invention can be reproduced while modifying secondary aspects of the embodiments which have been described in detail above, while retaining at least some of the cited advantages. In particular, the following modifications can be applied:

using a DPMZ type component, for "Dual Parallel Mach-Zehnder" as described in the article "Tunable Frequency Shifter Based on $LiNbO_3$ I/Q Modulators", by Alexandre Mottet et al., Photline Technologies, ZI Les Tilleroyes—Trépillot, 16 rue Auguste Jouchoux, 25000 Besangon, France, in place of at least one of electro-optical modulators 51 and 53;

when both improvements of double heterodyne detection and comb shape for the pulse spectrum are used, the detection signals can be filtered to select the mixture of a first line from the comb of radiations which correspond to the pulses after they have been retroreflected or backscattered by the target, with a second line from the comb of pulses as emitted towards the target, these first and second lines being associated with different values of the index k;

using two simultaneous modulations, which are applied for each pulse separately to both of the pulse components transmitted by the two transfer pathways 13*a* and 13*b*, one of the modulations being performed in transfer pathway 13*a* and the other in transfer pathway 13*b*. For example, the modulation carried out in transfer pathway 13*a* can modify the optical frequency of the radiation according to an increment which gradually increases from 90 MHz to 100 MHz during each pulse, and the other modulation which is carried out simultaneously but in transfer pathway 13*b* can modify the optical frequency according to another increment which gradually decreases from 120 MHz to 110 MHz during each pulse;

using forms of modulation other than linear variations of the optical frequency, including phase modulation in place of optical frequency modulation; and using only a single detection pathway in detection path 20 to supply digital processing module 27 with detection signals, this single detection pathway being assigned for each emitted pulse first to the reference path function then to the measurement path function, when the target is far enough away that the beginnings of the measurement detection signals do not overlap the ends of the reference detection signals.

Lastly, all the numerical values which have been cited have been provided for illustrative purposes only, and can be changed.

The invention claimed is:

1. A LIDAR system comprising a transmission path and a detection path, the transmission path comprising a laser source and being adapted to emit radiation pulses towards a target which is external to the LIDAR system, wherein the transmission path comprises two transfer pathways which are placed in parallel and arranged so as to simultaneously receive, at respective inputs of said transfer pathways, respective portions of a radiation from the laser source, and arranged, at output, to superpose components of each pulse which are delivered by said two transfer pathways, at least one of both transfer pathways comprising:

a modulator, called a pulse-compression modulator; and a pulse-compression controller, connected so as to control the pulse-compression modulator in a manner that modulates the pulse component delivered by said transfer pathway, so that, during an operation of the LIDAR system, at least two components of each pulse are produced simultaneously from the radiation originating from the laser source, are superposed within the pulse over a duration of said pulse, have respective spectra which are different, and at least one of both components of the pulse is phase- or frequency-modulated, and wherein the detection path comprises at least one photodetector and is arranged to fulfill the functions of:

a measurement path, dedicated to detecting the radiations which correspond one-to-one to the pulses emitted by the transmission path after said pulses have been retroreflected or backscattered by the target, delivering measurement detection signals; and a reference path, dedicated to detecting the radiations representative of the pulses as emitted by the transmission path, delivering reference detection signals; and the detection path further comprising a digital processing module which is arranged to receive the measurement detection signals and the reference detection signals, and which is configured to calculate a correlation function between said measurement detection signals and reference detection signals, so that the at least one component of each pulse which is modulated, combined with the calculated correlation function, produces a pulse-compression effect.

2. The LIDAR system according to claim 1, wherein each pulse-compression controller is adapted to control, during the operation of the LIDAR system and for the pulse component which is delivered by the transfer pathway to which said pulse-compression controller belongs, a gradual variation in optical frequency over the duration of the pulse.

3. The LIDAR system according to claim 2, wherein each pulse-compression controller is further adapted so that the gradual variation in optical frequency has a rate of variation which is substantially constant over the duration of the pulse.

4. The LIDAR system according to claim 1, wherein the detection path comprises:

a first detection pathway dedicated to forming the measurement path, comprising a first photodetector arranged to receive the radiations which correspond one-to-one to the pulses emitted by the transmission path after said pulses have been retroreflected or backscattered by the target, and delivering the measurement detection signals; and a second detection pathway, separate from the first detection pathway and dedicated to forming the reference path, comprising a second photodetector arranged to receive the radiations representative of the pulses as emitted by the transmission path, and delivering the reference detection signals, the digital processing module being connected to respective outputs of the first and second detection pathways in order to receive the measurement detection signals and the reference detection signals.

5. The LIDAR system according to claim 1, wherein the detection path comprises:

a photodetector shared by both functions of measurement path and reference path, which is intended to receive, during separate time windows, the radiations which correspond one-to-one to the pulses emitted by the transmission path after said pulses have been retroreflected or backscattered by the target, and the radiations representative of the pulses as emitted by the transmission path, delivering detection signals during each time window; and a controller, which assigns the detection signals delivered by the shared photodetector, as either measurement detection signals or as reference detection signals, depending on the time windows.

6. The LIDAR system according to claim 1, wherein the detection path is optically coupled so as to additionally receive other portions of the radiation from the laser source, on the one hand at a same time as the radiations which correspond one-to-one to the pulses emitted by the transmission path after said pulses have been retroreflected or backscattered by the target, and on the other hand at a same time as the radiations representative of the pulses as emitted by the transmission path.

7. The LIDAR system according to claim 6, wherein the digital processing module is adapted on the one hand to mix components of the measurement detection signals which respectively originate from both transfer pathways so as to obtain a product time signal for the measurement path, which is devoid of phase fluctuations of the laser source, and on the other hand to mix components of the reference detection signals which respectively originate from said both transfer pathways so as to separately obtain a product time signal for the reference path, which is also devoid of phase fluctuations of the laser source, and the digital processing module is adapted to calculate the correlation function between the respective product time signals of the measurement path and the reference path.

8. The LIDAR system according to claim 6, wherein the transmission path further comprises:

a first comb generation modulator, arranged to be effective on the components of each pulse which are delivered by both transfer pathways; and a first comb controller, connected so as to control the first comb generation modulator, and configured to apply to said first comb generation modulator a first control signal composed of a several first equidistant spectral lines, said first spectral lines being separated by a first increment between any two of said first lines which are spectral neighbors, the detection path further comprises:

a second comb generation modulator, arranged to be effective on said other portions of the radiation from the laser source, on the one hand at a same time as the radiations are detected which correspond one-to-one to the pulses emitted by the transmission path after said pulses have been retroreflected or backscattered by the target, and on the other hand at the same time as the radiations are detected which are representative of the pulses as emitted by the transmission path; and a second comb controller, connected so as to control the second comb generation modulator, and configured to apply to said second comb generation modulator a second control signal composed of several second equidistant spectral lines, said second spectral lines being separated by a second increment between any two of said second lines which are spectral neighbors, a difference between the first and second increments being greater than a spectral width used to obtain the pulse-compression effect, and the digital processing module is configured to add or average detection signal contributions which relate to different pairs of optical lines, each pair of optical lines being formed by a first optical line produced by the first comb generation modulator and a second optical line produced by the second comb generation modulator.

9. The LIDAR system according to claim 6, wherein the transmission path further comprises:

a first comb generation modulator, arranged to be effective on the components of each pulse which are delivered by both transfer pathways; and a first comb controller, connected so as to control the first comb generation modulator, and configured to apply to said first comb generation modulator a first control signal composed of several first equidistant spectral lines, said first spectral lines being separated by a first increment between any two of said first lines which are spectral neighbors, the detection path further comprises:

a second comb generation modulator, arranged to be effective on said other portions of the radiation from the laser source, on the one hand at a same time as the radiations are detected which correspond one-to-one to the pulses emitted by the transmission path after said pulses have been retroreflected or backscattered by the target, and on the other hand at the same time as the radiations are detected which are representative of the pulses as emitted by the transmission path; and a second comb controller, connected so as to control the second comb generation modulator, and configured to apply to said second comb generation modulator a second control signal composed of several second equidistant spectral lines, said second spectral lines being separated by a second increment between any two of said second lines which are spectral neighbors, a difference between the first and second increments being greater than a spectral width used to obtain the pulse-compression effect, and the digital processing module is configured to calculate the correlation function between respective product time signals of the measurement path and of the reference path, the product time signal of the measurement path being a mixture of two comb spectral components which respectively originate from both transfer pathways and have been retroreflected or backscattered by the target, and the product time signal of the reference path being a mixture of two comb spectral components which respectively originate from said both transfer pathways but which are part of the radiations representative of the pulses as emitted by the transmission path, each mixing being carried out in a manner that eliminates an effect of phase fluctuations of the laser source.

10. The LIDAR system according to claim 1, wherein the transmission path further comprises:

a first comb generation modulator, arranged in one of both transfer pathways so as to be effective on the radiation portion transmitted by said transfer pathway;

a first comb controller, connected so as to control the first comb generation modulator, and configured to apply to said first comb generation modulator a first control signal composed of several first equidistant spectral lines, said first spectral lines being separated by a first increment between any two of said first lines which are spectral neighbors;

a second comb generation modulator, arranged in the other of both transfer pathways so as to be effective on the radiation portion transmitted by said other transfer pathway; and a second comb controller, connected so as to control the second comb generation modulator, and configured to apply to said second comb generation modulator a second control signal composed of several second equidistant spectral lines, said second spectral lines being separated by a second increment between any two of said second lines which are spectral neighbors, a difference between the first and second increments being greater than a spectral width used to obtain the pulse-compression effect, and the digital processing module is configured to add or average contributions of detection signals which relate to different pairs of optical lines, each pair of optical lines being formed by a first optical line produced by the first comb generation modulator and a second optical line produced by the second comb generation modulator.

11. The LIDAR system according to any one of claims 8 to 10, wherein the first and second comb generation modulators are of electro-optical modulator type.

12. The LIDAR system according to claim 1, wherein a product of a spectral width of each pulse component which is modulated to produce the pulse-compression effect, and the duration of said pulse, is greater than 500.

* * * * *